US012766697B2

(12) United States Patent
Chang

(10) Patent No.: US 12,766,697 B2
(45) Date of Patent: Oct. 20, 2026

(54) TOOL STORAGE DEVICE

(71) Applicant: CHUN NIEN PLASTIC LTD., Taichung City (TW)

(72) Inventor: Chi-Tsai Chang, Taichung City (TW)

(73) Assignee: CHUN NIEN PLASTIC LTD., Taichung City (TW)

( * ) Notice: Subject to any disclaimer, the term of this patent is extended or adjusted under 35 U.S.C. 154(b) by 0 days.

(21) Appl. No.: 19/059,991

(22) Filed: Feb. 21, 2025

(65) Prior Publication Data

US 2025/0269514 A1 Aug. 28, 2025

(30) Foreign Application Priority Data

Feb. 23, 2024 (TW) ................................ 113201862

(51) Int. Cl.
*B25H 3/06* (2006.01)
*B25H 3/00* (2006.01)

(52) U.S. Cl.
CPC ............... *B25H 3/06* (2013.01); *B25H 3/003* (2013.01)

(58) Field of Classification Search
CPC . B25H 3/003; B25H 3/02; B25H 3/04; B25H 3/06
USPC ........ 206/372, 373, 376, 377, 379; 211/70.6
See application file for complete search history.

(56) References Cited

U.S. PATENT DOCUMENTS

| | | | | | |
|---|---|---|---|---|---|
| 5,570,784 | A * | 11/1996 | Sidabras | B25H 3/003 | 206/378 |
| 6,615,983 | B1 * | 9/2003 | Yu | B25H 3/003 | 206/378 |
| 8,387,791 | B2 * | 3/2013 | Huang | B25H 3/022 | 206/378 |
| 11,685,038 | B2 * | 6/2023 | Lai | B25H 3/003 | 206/373 |
| 2005/0103664 | A1 * | 5/2005 | Shih | B25B 13/56 | 206/378 |
| 2008/0314795 | A1 * | 12/2008 | Lin | B25H 3/00 | 206/234 |
| 2011/0031145 | A1 * | 2/2011 | Larson | B25H 3/003 | 206/372 |
| 2016/0136791 | A1 * | 5/2016 | Ou | B25H 3/003 | 206/377 |

FOREIGN PATENT DOCUMENTS

CN 201015869 Y 2/2008

* cited by examiner

*Primary Examiner* — Luan K Bui
(74) *Attorney, Agent, or Firm* — MUNCY, GEISSLER, OLDS & LOWE, P.C.

(57) ABSTRACT

A tool storage device is provided, wherein the tool storage device includes: a base; and at least one first seat swingably disposed on the base, and including at least one first chamber, the first chamber configured to receive a tool. Whereby, the first seat is swingable relative to the base to adjust the position angle of the first chamber, allowing the user to take or place the tool in the first chamber from a lateral direction.

15 Claims, 13 Drawing Sheets

TOOL STORAGE DEVICE

BACKGROUND OF THE INVENTION

Field of the Invention

The present invention relates to a storage device, particularly to a tool storage device.

Description of the Prior Art

Conventional tool storage devices are provided with a plurality of spaced grooves. A user inserts a tool (such as a screwdriver bit) into the grooves for display and storage. A screwdriver bit storage seat as disclosed in CN201015869 is a kind of this conventional tool storage device.

However, although the above patent effectively unifies the storage of screwdriver bits, the placement angle is strictly limited. As a result, the user must move to a specific angle (right above) to smoothly take or place the tool. Therefore, it is necessary to provide a novel and advanced tool storage device to solve the above problems.

The present invention is, therefore, arisen to obviate or at least mitigate the above-mentioned disadvantages.

SUMMARY OF THE INVENTION

The main object of the present invention is to provide a tool storage device in which a first seat is swingable relative to a base to adjust the position angle of a first chamber, allowing the user to take or place the tool in the first chamber from a lateral direction.

To achieve the above and other objects, a tool storage device is provided, wherein the tool storage device includes: a base; and at least one first seat swingably disposed on the base, and including at least one first chamber, the first chamber configured to receive a tool.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
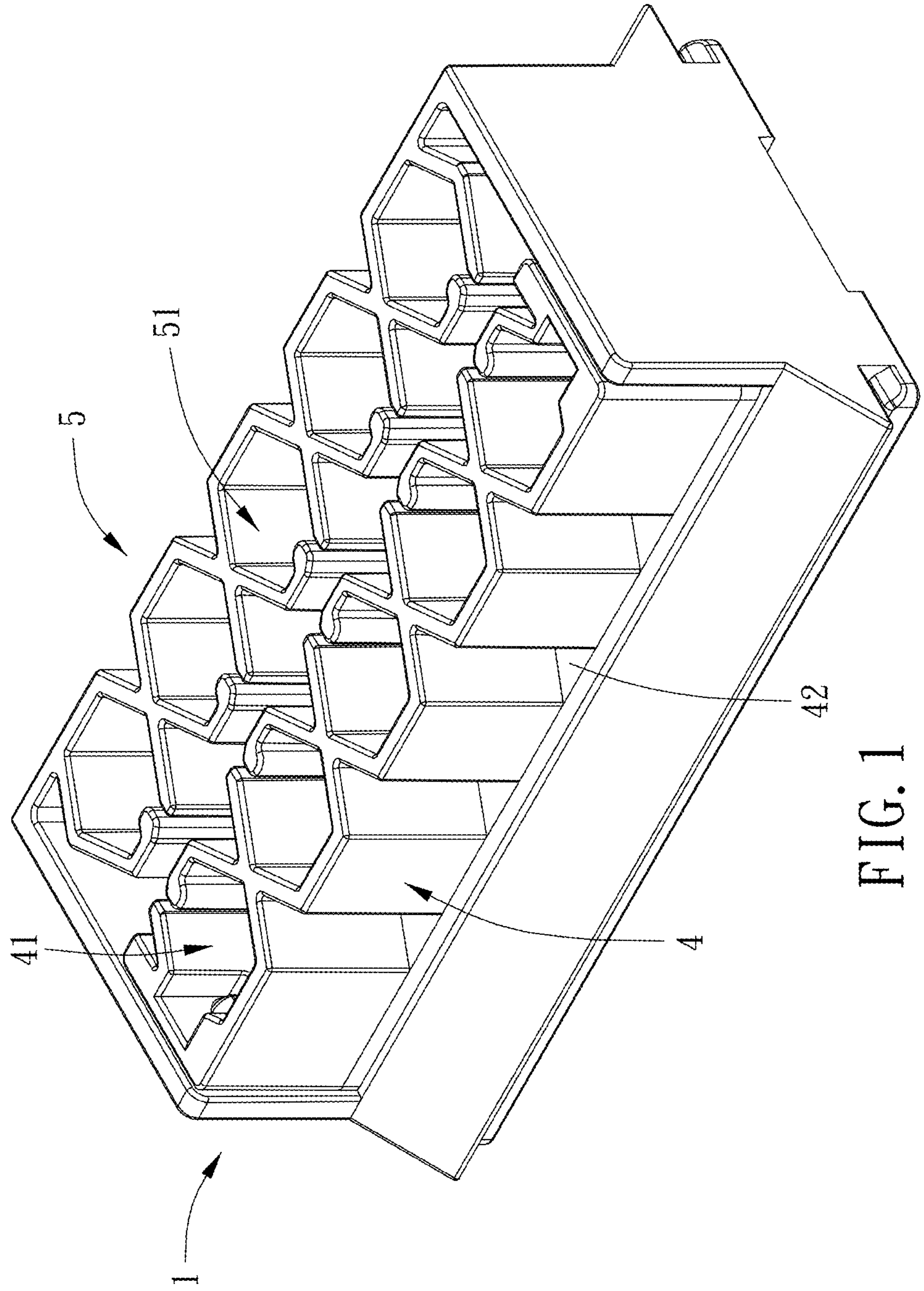
FIG. 1 is a perspective view of a first exemplary embodiment of the present invention.
Figure 2:
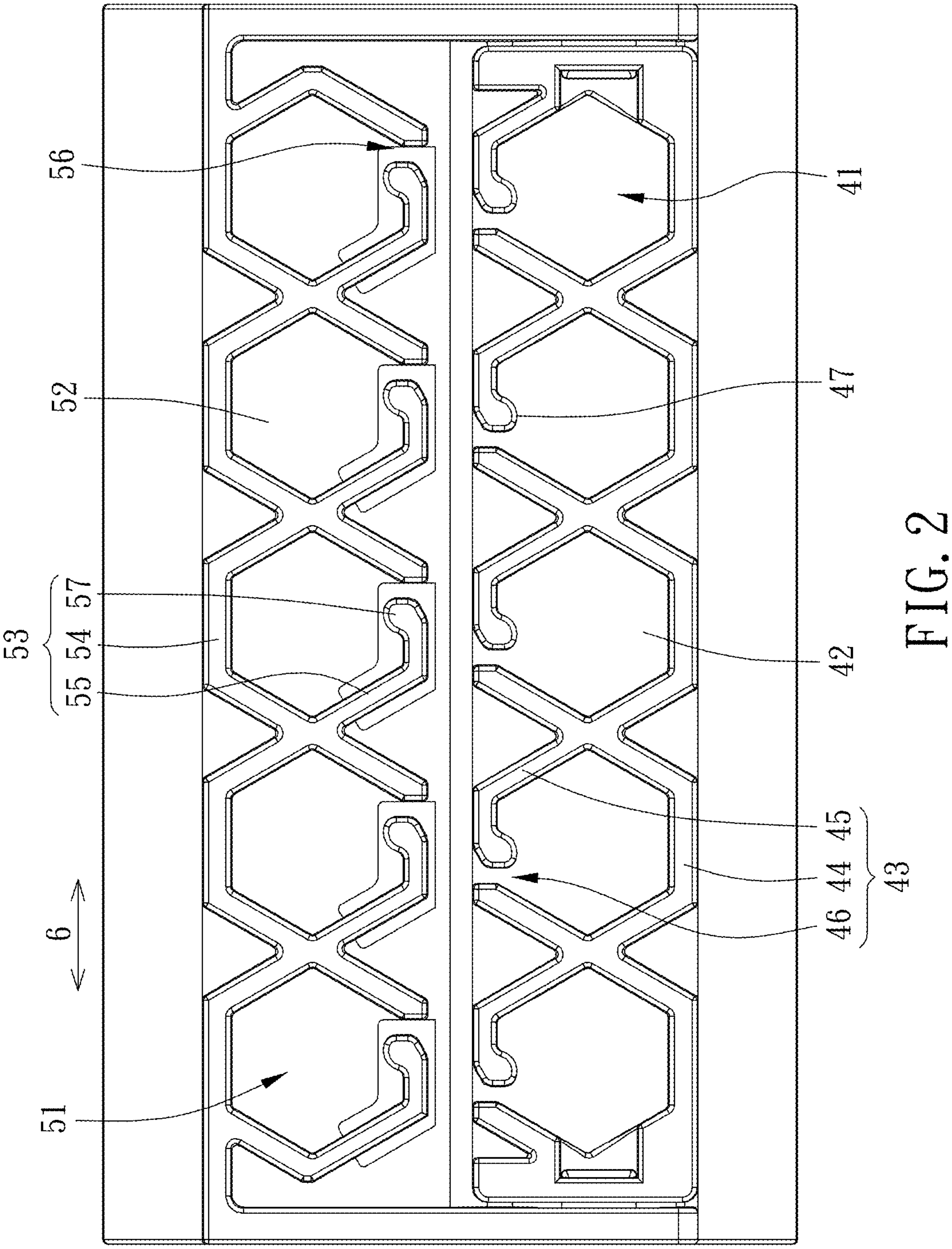
FIG. 2 is a top view of FIG. 1.
Figure 3:
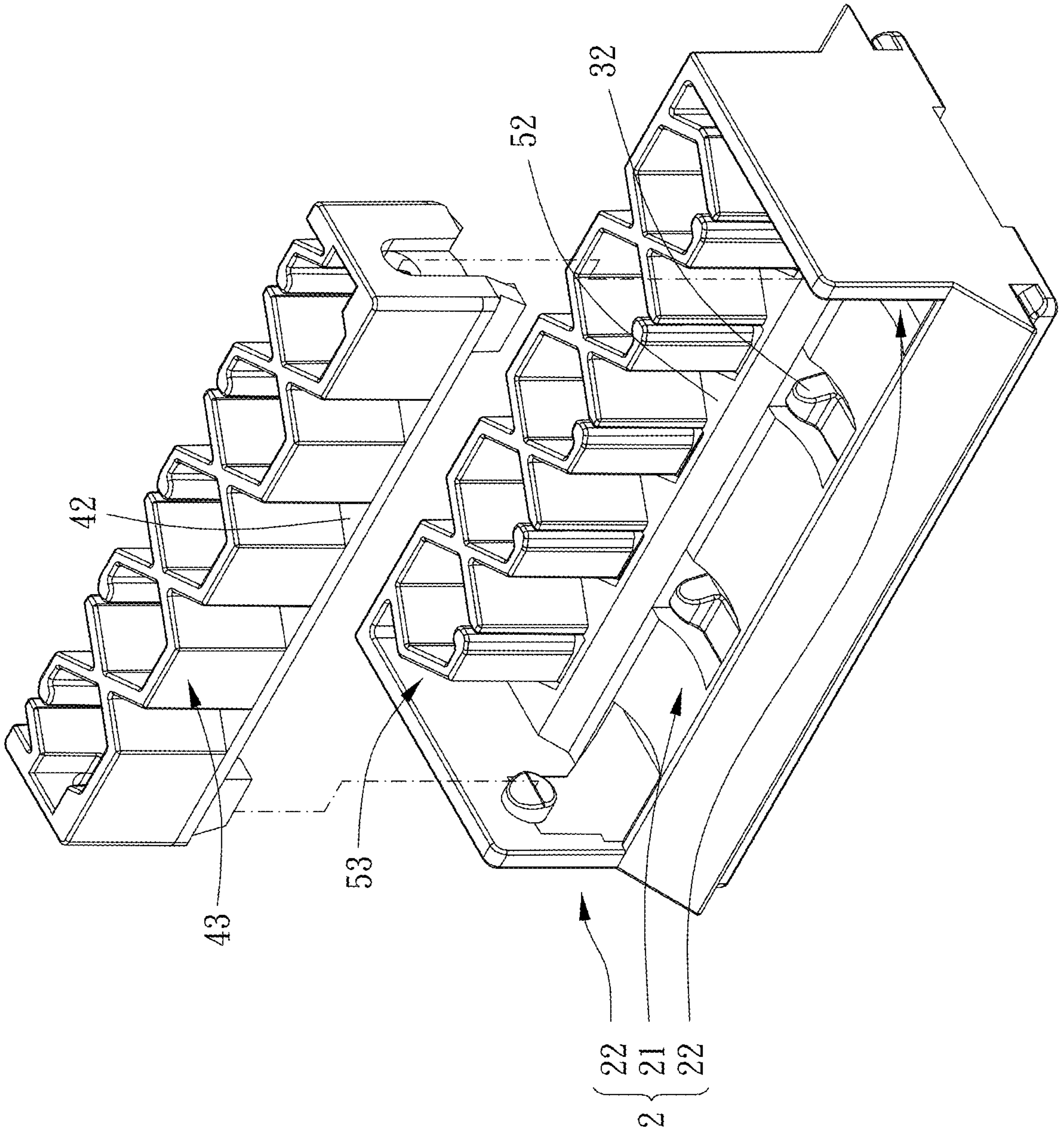
FIG. 3 is an exploded view of FIG. 1.
Figure 4:
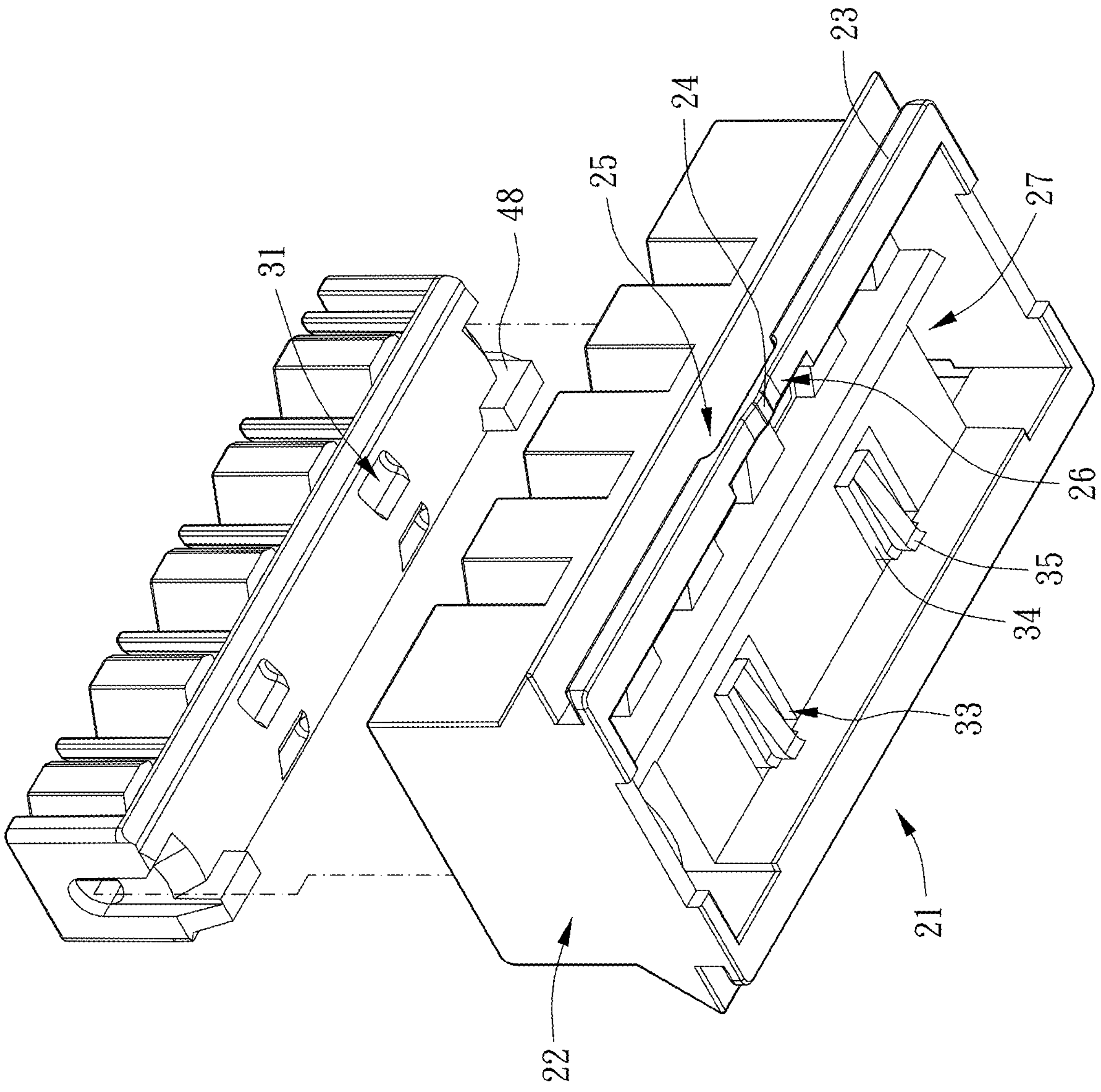
FIG. 4 is another perspective view of FIG. 3.
Figure 5:
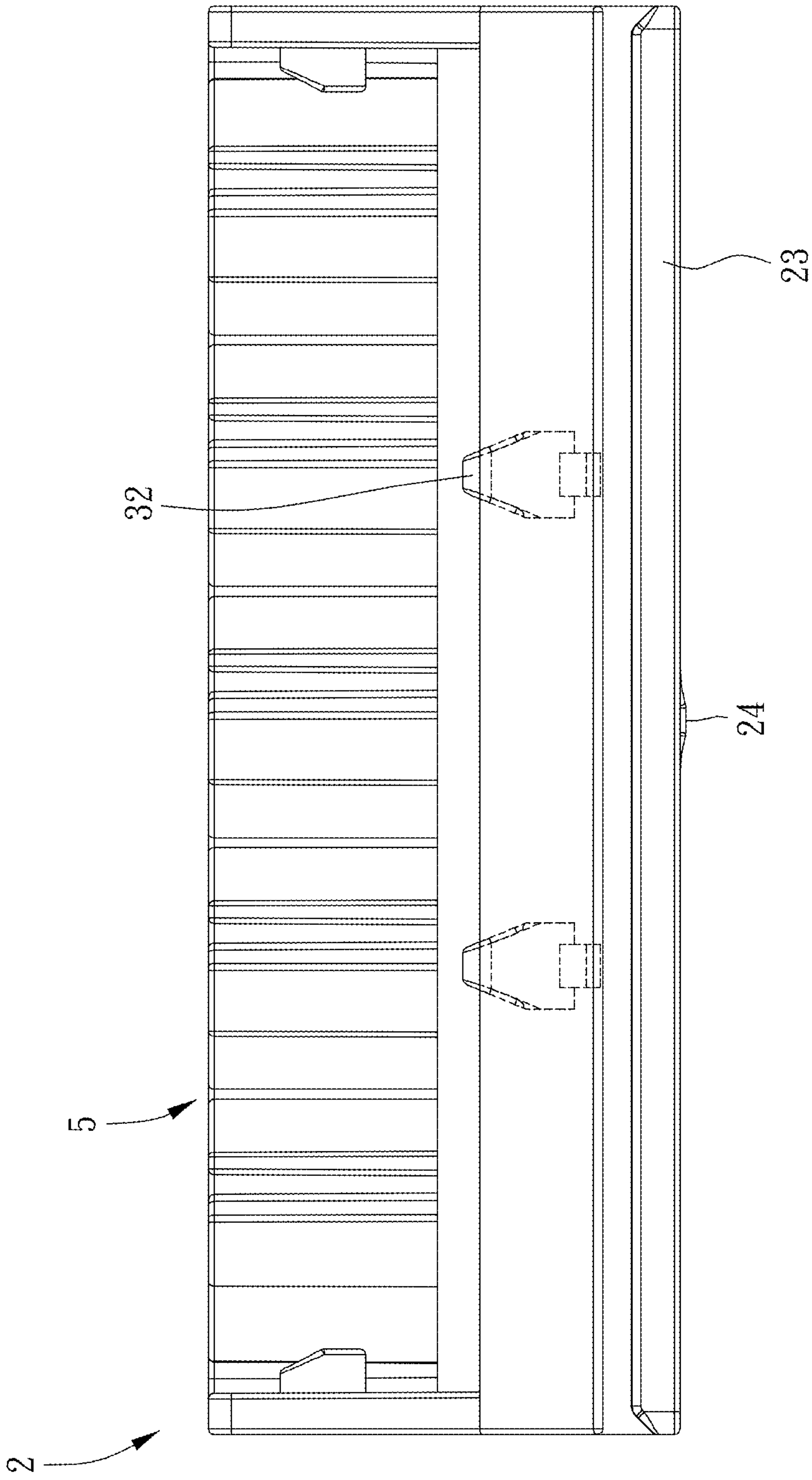
FIG. 5 is a front view of the base of the first exemplary embodiment of the present invention.
Figure 6:
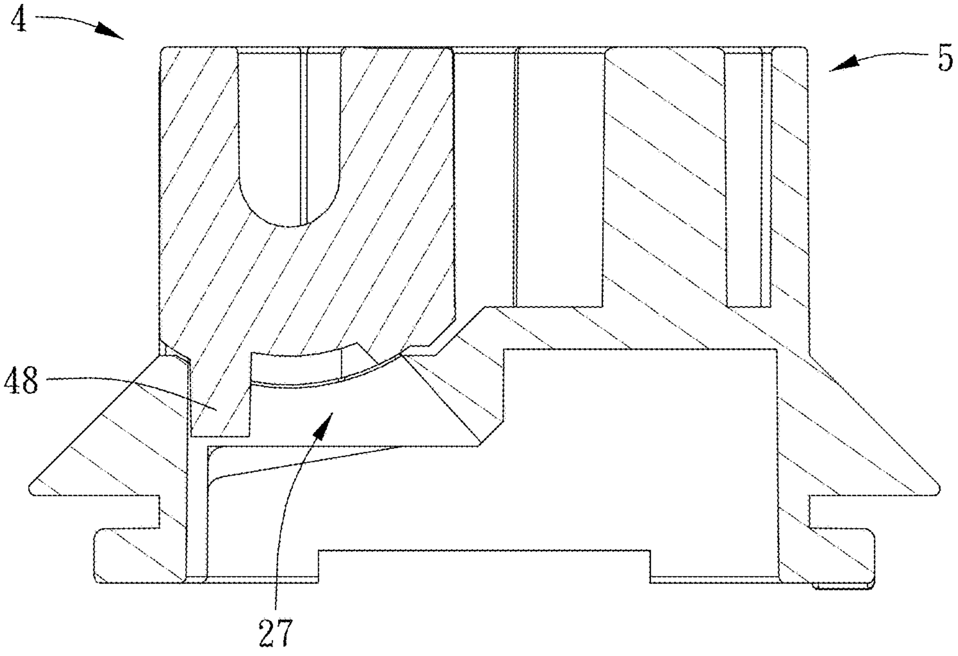
FIGS. 6 and 7 are schematic views of the restricting convexity swinging relative to the restriction hole in the first exemplary embodiment of the present invention.
Figure 7:
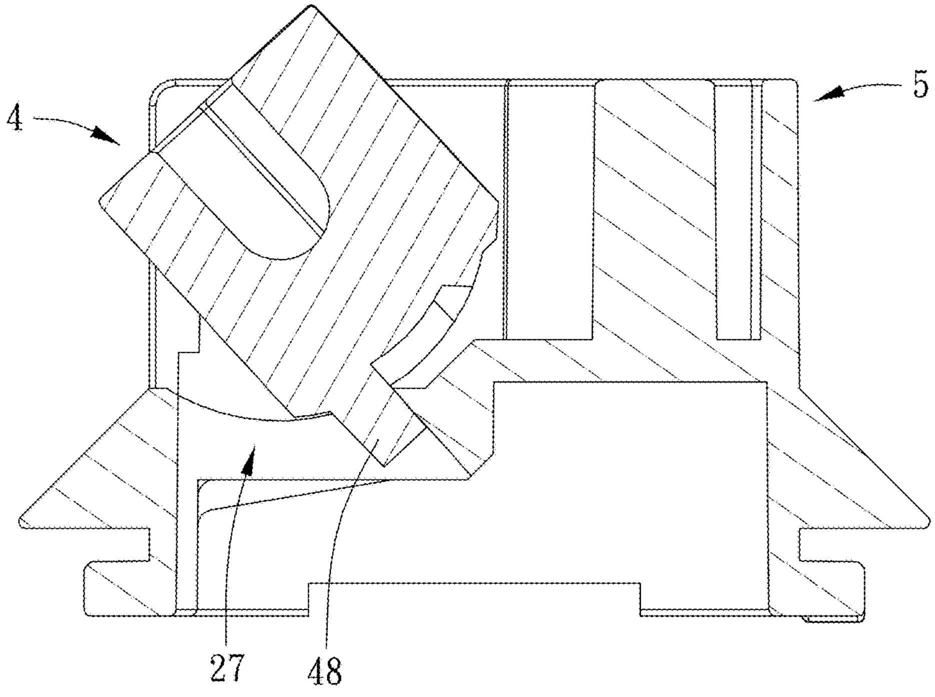
Figure 8:
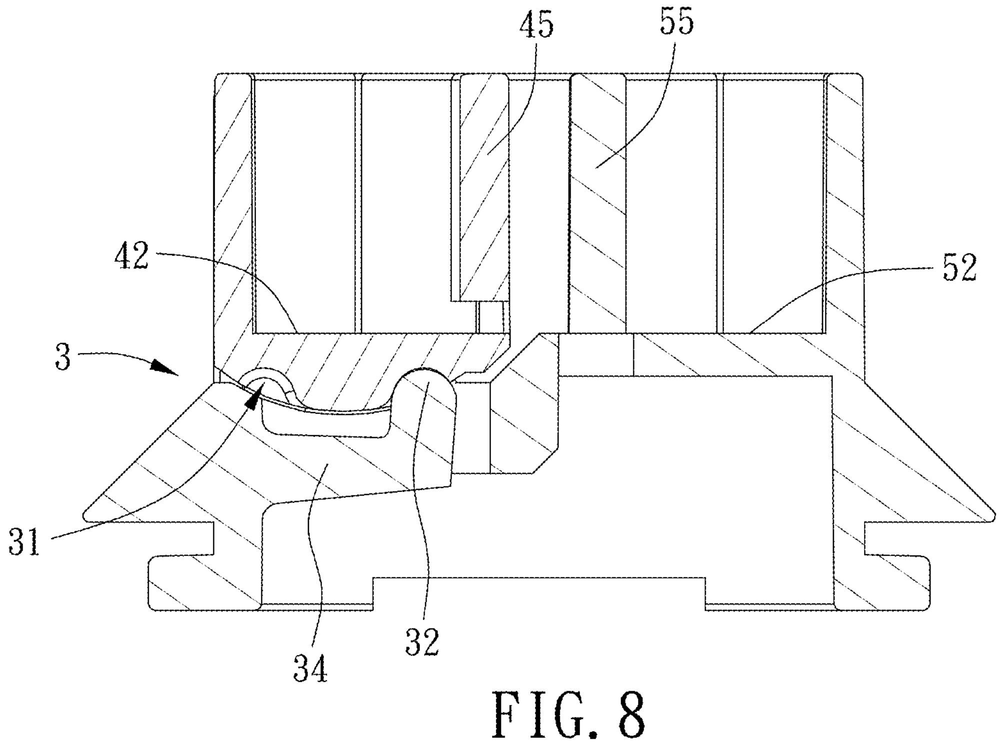
FIGS. 8 and 9 are schematic views of the positioning projection being embedded in different positioning recesses in the first exemplary embodiment of the present invention.
Figure 9:
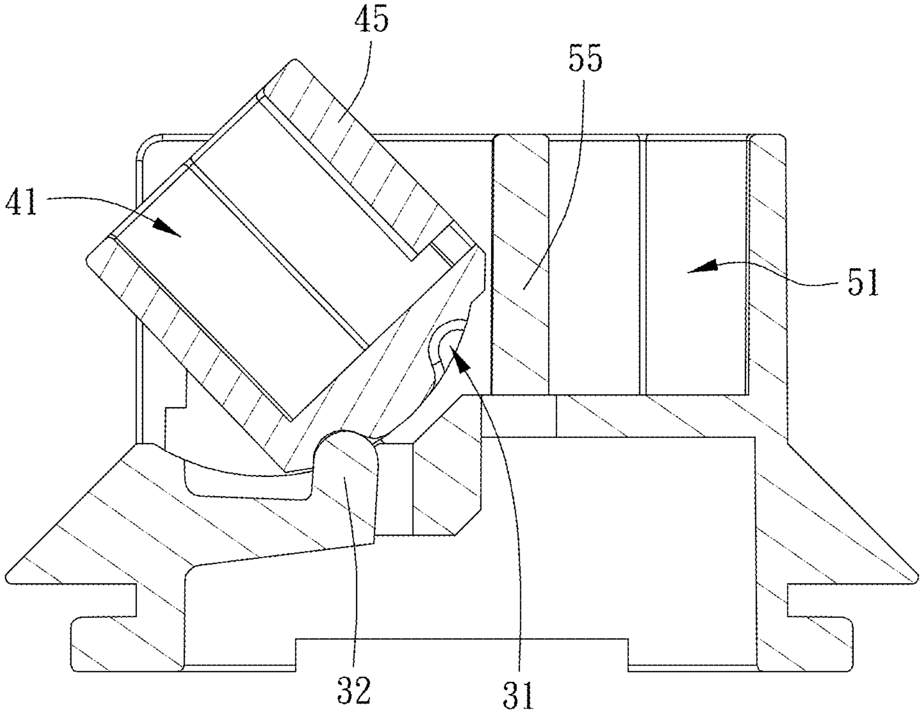
Figure 10:
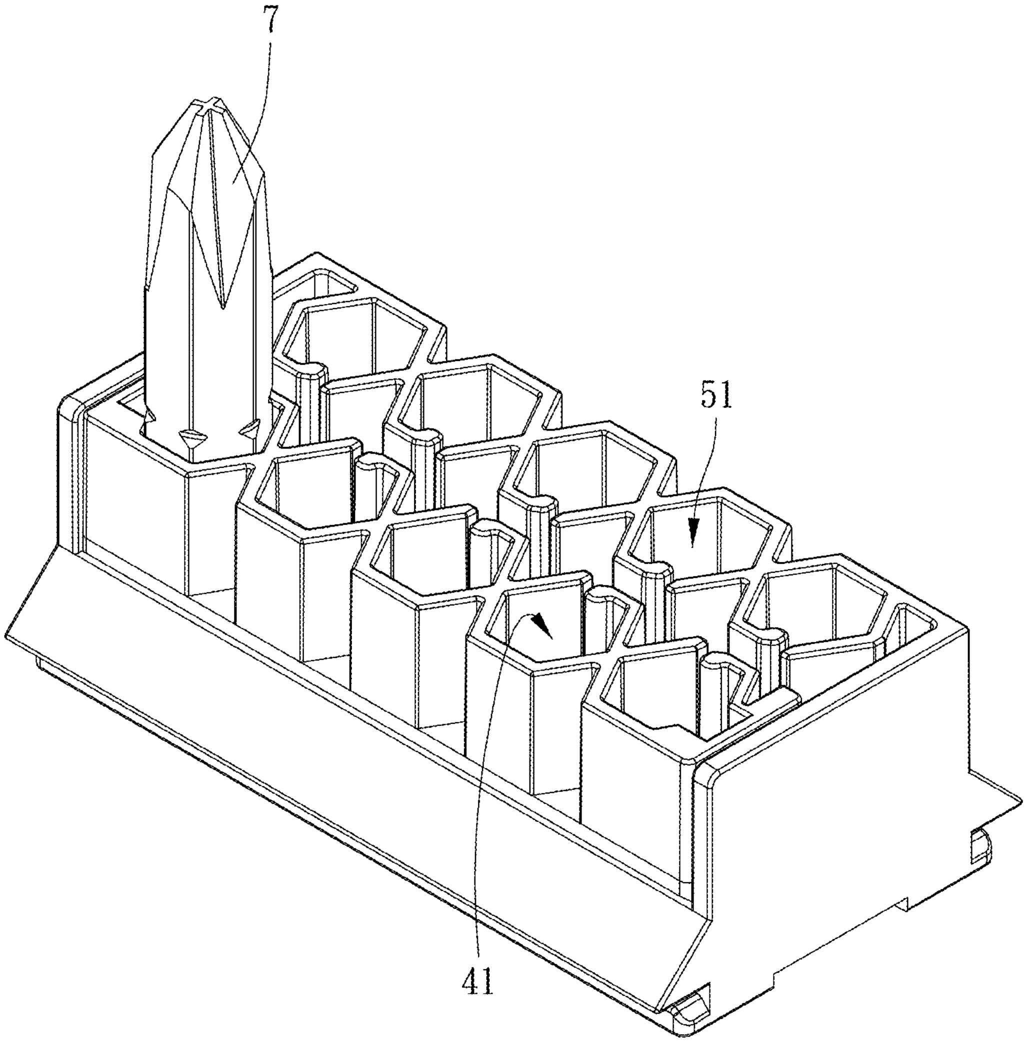
FIG. 10 is a schematic view of the tool being inserted into the first chamber in the first exemplary embodiment of the present invention.
Figure 11:
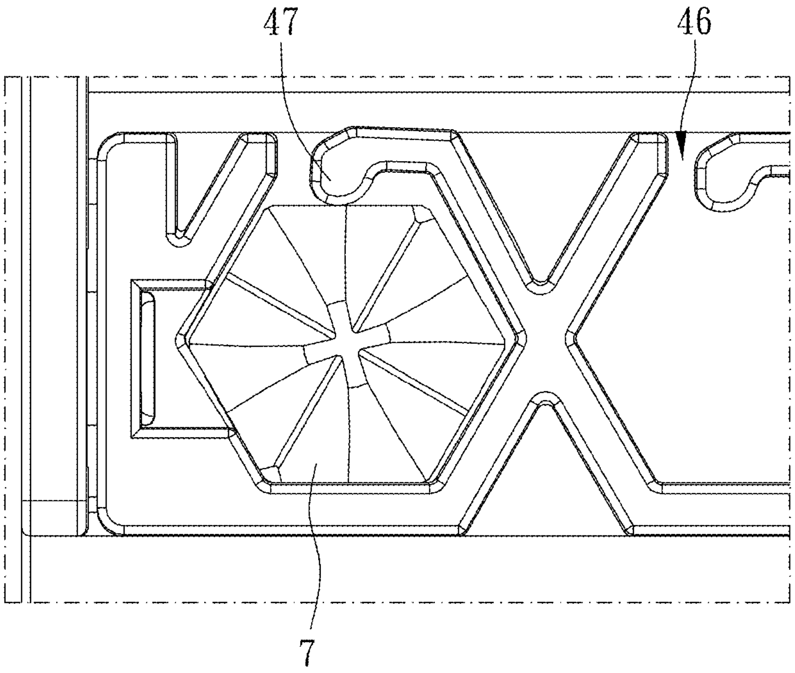
FIG. 11 is a top partial enlarged view of FIG. 10.
Figure 12:
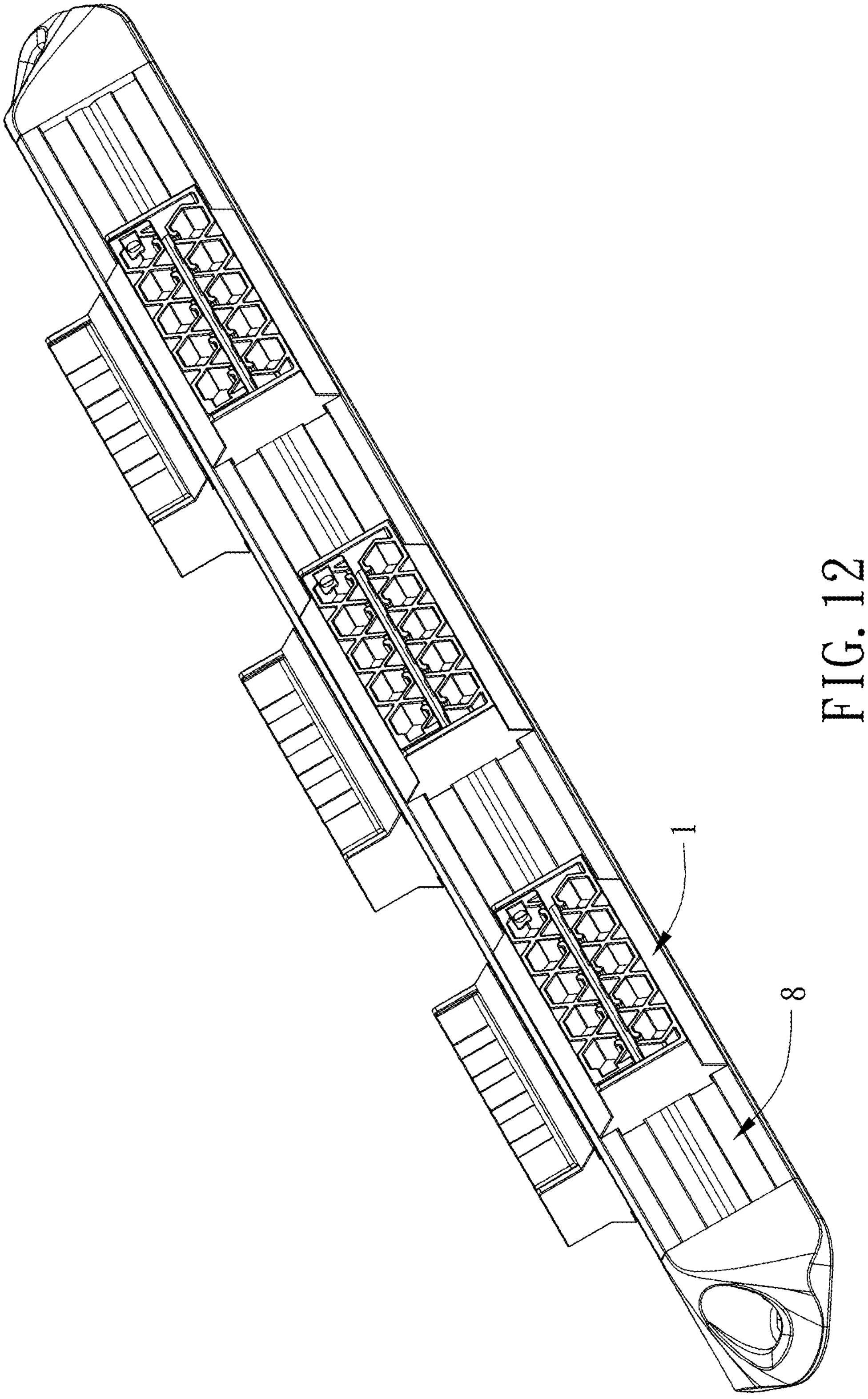
FIG. 12 is a perspective view of the base being slidably disposed in a track in the first exemplary embodiment of the present invention.
Figure 13:
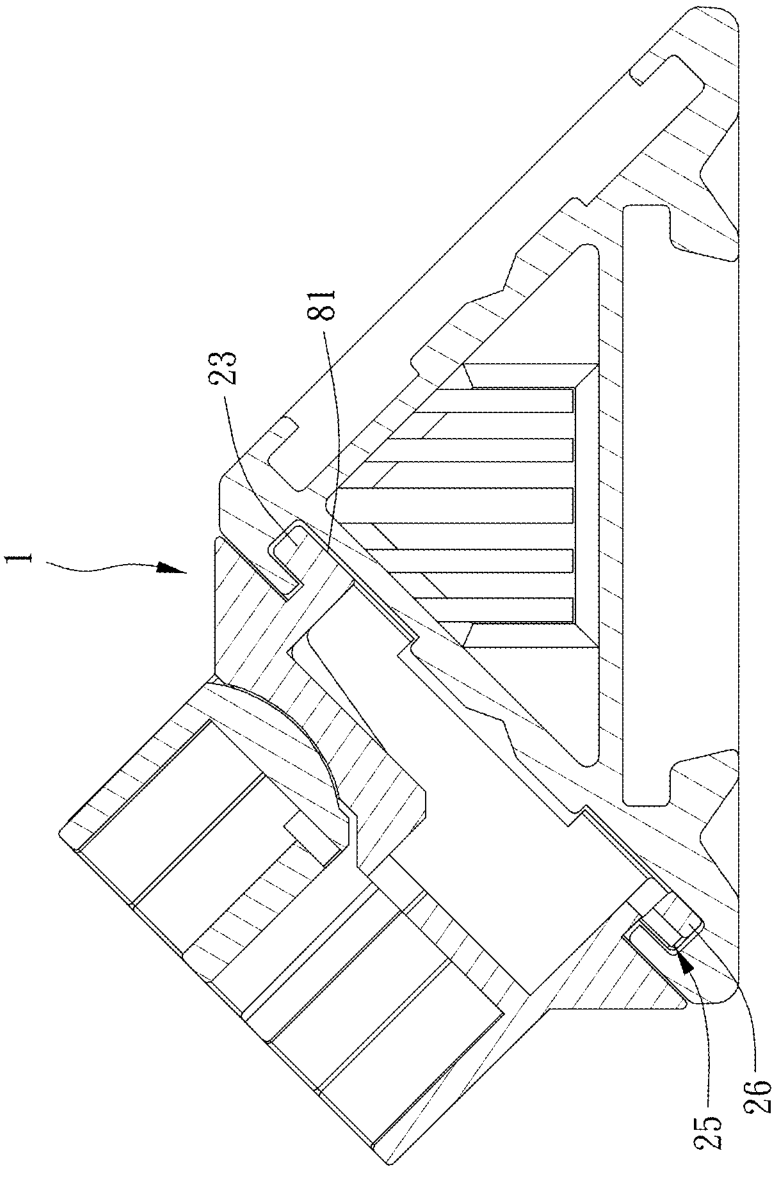
FIG. 13 is a cross-sectional enlarged view of FIG. 12.

Please refer to FIGS. 1 to 13 for an exemplary embodiment of the present invention. A tool storage device 1 of the present invention includes a base 1 and at least one first seat 4. The at least one first seat 4 is swingably disposed on the base 1 to be adjusted as needed, allowing the user to access the tool from a lateral direction of the base 1. The at least one first seat 4 includes at least one first chamber 41, and the first chamber 41 is configured to receive a tool 7. The tool 7 may be, for example, but is not limited to, a screwdriver bit.

More specifically, the base 1 includes a main body 2 and at least one restriction hole 27. The main body 2 includes a bottom portion 21 and two side portions 22. The two side portions 22 protrude from the bottom portion 21. Two sides of the at least one first seat 4 are rotatably connected to the two side portions 22. The bottom portion 21 is arcuate relative to a side of the at least one first seat 4. The at least one restriction hole 27 is disposed through the bottom portion 21. At least one restricting convexity 48 of the at least one first seat 4 is inserted in the at least one restriction hole 27, thereby limiting the swinging range of the at least one first seat 4. Additionally, the at least one restriction hole 27 adopts an open structure penetrating through the bottom portion 21, allowing a relatively large tolerance range in the depth direction of the at least one restriction hole 27 for the at least one restricting convexity 48. In other words, it can accommodate greater dimensional and assembly errors.

Furthermore, the base 1 further includes at least one positioning structure 3. The at least one positioning structure 3 includes two positioning recesses 31 and a positioning projection 32. One of the two positioning recesses 31 and the positioning projection 32 is disposed on the at least one first seat 4, and the other of the two positioning recesses 31 and the positioning projection 32 is disposed on the bottom portion 21. When the at least one first seat 4 swings relative to the main body 2, the positioning projection 32 is configured to be embedded in one of the two positioning recesses 31, thereby stably positioning the at least one first seat 4 at a specific angle.

In the first exemplary embodiment, the at least one positioning structure 3 further includes a perforation 33 and a positioning arm 34. The perforation 33 is disposed through the bottom portion 21. The positioning arm 34 is disposed on the bottom portion 21 and protrudes through the perforation 33. The positioning projection 32 is formed on the positioning arm 34 and gradually tapers in a direction away from the positioning arm 34. The two positioning recesses 31 are disposed on the at least one first seat 4. The perforation 33 provides sufficient clearance space for the positioning arm 34, allowing the positioning arm 34 to deform and displace in correspondence with the outer contour of the at least one first seat 4.

Preferably, the at least one positioning structure 3 further includes a reinforcement rib 35. The reinforcement rib 35 is connected to and between the bottom portion 21 and the positioning arm 34 to enhance the connection strength between the positioning arm 34 and the bottom portion 21. The thickness of the reinforcement rib 35 gradually decreases in a direction from the bottom portion 21 toward the positioning projection 32.

The base 1 further includes two flanges 23. The main body 2 extends in a first direction 6. The two flanges 23 protrude in a direction perpendicular to the first direction 6 from the main body 2. The two flanges 23 are configured to be slidably inserted in a track 8. Specifically, the base 1 further includes at least one urging convexity 24. The at least one urging convexity 24 is disposed on at least one of the two flanges 23. The at least one urging convexity 24 is configured to press against an inner surface 81 of the track 8, thereby stably positioning the base 1 in the track 8. More specifically, the base 1 further includes at least one through hole 25. The at least one through hole 25 is disposed through at least one of the two flanges 23 such that a portion of at least one of the two flanges 23 is not connected to the main body 2, thereby forming at least one elastic section 26. The at least one urging convexity 24 is disposed on the at least one elastic section 26. The at least one through hole 25 provides clearance space for deformation of the at least one elastic section 26.

The at least one first seat 4 further includes a first bottom wall 42 and at least one first frame 43. The first frame 43 protrudes laterally from the first bottom wall 42 to define the first chamber 41. The first frame 43 includes a first fixed wall 44 and a first movable wall 45. The first fixed wall 44 is fixed to the first bottom wall 42. The first movable wall 45 is connected to the first fixed wall 44 and is swingable relative to the first bottom wall 42. The first movable wall 45 and the first fixed wall 44 define a first slot 46. The first slot 46 is in communication with the first chamber 41.

Preferably, the at least one first frame 43 further includes a first urging block 47. The first urging block 47 is disposed on the first movable wall 45 and protrudes within the first chamber 41. The first urging block 47 is configured to press against the tool 7 to enhance positioning stability.

The tool storage device further includes at least one second seat 5. The at least one second seat 5 is fixed to the base 1. The at least one second seat 5 includes at least one second chamber 51 configured to receive the tool 7. In the first exemplary embodiment, the at least one second seat 5 and the base 1 are integrally formed of one piece, for example, by plastic injection molding.

The at least one second seat 5 further includes a second bottom wall 52 and at least one second frame 53. The second frame 53 protrudes laterally from the second bottom wall 52 to define the second chamber 51. The second frame 53 includes a second fixed wall 54 and a second movable wall 55. The second fixed wall 54 is fixed to the second bottom wall 52. The second movable wall 55 is connected to the second fixed wall 54 and is swingable relative to the second bottom wall 52. The second movable wall 55 and the second fixed wall 54 define a second slot 56. The second slot 56 is in communication with the second chamber 51.

Preferably, the at least one second frame 53 further includes a second urging block 57. The second urging block 57 is disposed on the second movable wall 55 and protrudes within the second chamber 51. The second urging block 57 is configured to press against the tool 7 to enhance positioning stability.

In the first exemplary embodiment, the number of the at least one first seat 4 is one. The number of the at least one second seat 5 is one. The at least one first frame includes a plurality of first frames 43, the at least one second frame includes a plurality of second frames 53, and the numbers of the at least one first frame 43 and the at least one second frame 53 are equal. The plurality of first frames 43 and the plurality of second frames 53 are arranged in a row in the first direction 6. Each of the plurality of first frames 43 corresponds to one of the plurality of second frames 53 in a direction perpendicular to the first direction 6. The first slot 46 is disposed on a side of the first frame 43 facing the second frame 53. The second slot 56 is disposed on a side of the second frame 53 facing the first frame 43. More specifically, each of the first frames 43 is hexagonal, each of the second frames 53 is hexagonal, corners of two adjacent first frames 43 are connected to each other, and corners of two adjacent second frames 53 are connected to each other. In the direction perpendicular to the first direction 6, the first slot 46 and the second slot 56 are in an offset arrangement so that when the first movable wall 45 and the second movable wall 55 simultaneously swing, they do not interfere with each other.

Figure 14:
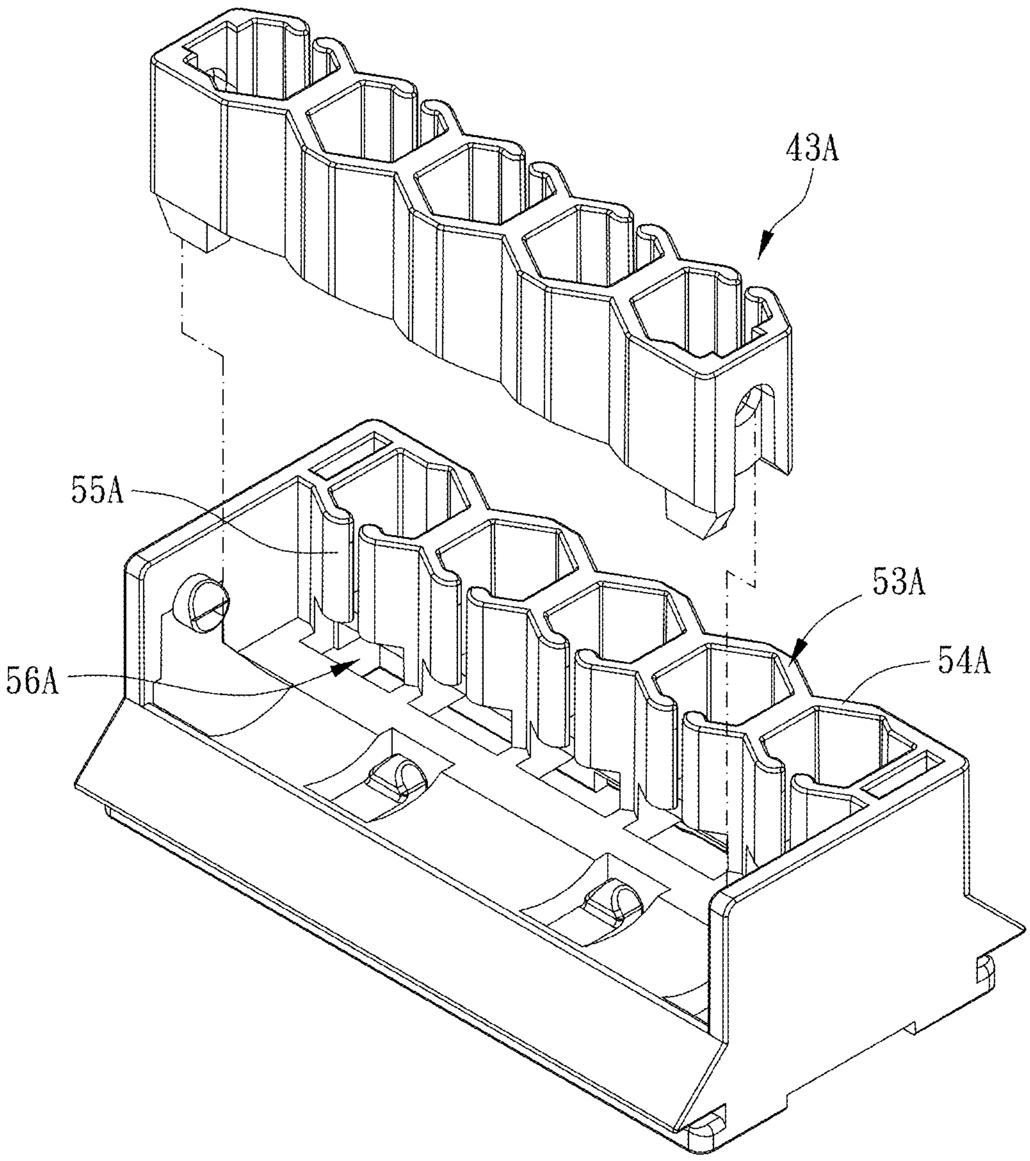
FIG. 14 is a perspective view of a second exemplary embodiment of the present invention.

Please refer further to FIG. 14, which illustrates a second exemplary embodiment. The difference from the first exemplary embodiment is the shape of the second frame 53A and the second slot 56A. The second frame 53A includes two second movable walls 55A and a second fixed wall 54A. The two second movable walls 55A are swingably disposed at two ends of the second fixed wall 54A. The two second movable walls 55A are symmetrically arranged and spaced above the second slot 56A. It is noted that the shape of the first frame 43A is the same as that of the second frame 53A.

Figure 15:
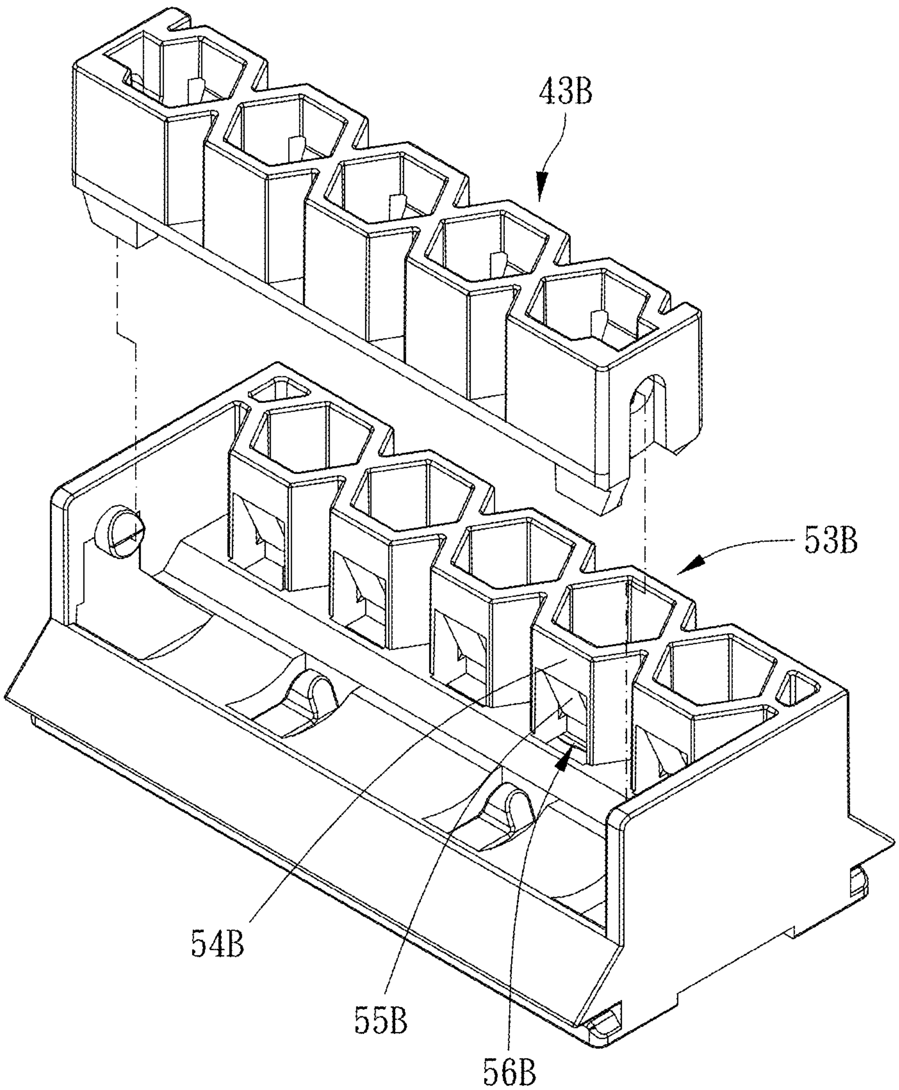
FIG. 15 is a perspective view of a third exemplary embodiment of the present invention.

Please refer further to FIG. 15, which illustrates a third exemplary embodiment. The difference from the first exemplary embodiment is the shape of the second frame 53B and the second slot 56B. The second frame 53B includes a second movable wall 55B and a second fixed wall 54B. An end of the second movable wall 55B is connected to the second fixed wall 54B, and another end of the second movable wall 55B is positioned above the second slot 56B and is a free end. It is noted that the shape of the first frame 43B is the same as that of the second frame 53B.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A tool storage device including:

a base; and at least one first seat swingably disposed on the base, and including at least one first chamber, the first chamber configured to receive a tool;

wherein the base includes a main body and two flanges, the main body extends in a first direction, the two flanges protrudes perpendicularly to the first direction from the main body, and the two flanges are configured to be slidably inserted in a track;

wherein the base further includes at least one urging convexity, the at least one urging convexity is disposed on at least one of the two flanges, and the at least one urging convexity is configured to press against an inner surface of the track.

2. The tool storage device of claim 1, wherein the base further includes at least one through hole, the at least one through hole is formed in at least one of the two flanges, such that a portion of at least one of the two flanges is not connected to the main body to form at least one elastic section, the at least one urging convexity is disposed on the at least one elastic section, and the at least one through hole provides a clearance space for deformation of the at least one elastic section.

3. The tool storage device of claim 1, wherein the base further includes at least one positioning structure, the main body includes a bottom portion and two side portions, the two side portions protrude from the bottom portion, two sides of the at least one first seat is rotatably connected to the two side portions, the bottom portion is arcuate relative to a side of the at least one first seat, the at least one positioning structure includes two positioning recesses and a positioning projection, one of the two positioning recesses and the positioning projection is disposed on the at least one first seat, and an other the two positioning recesses and the positioning projection is disposed on the bottom portion; when the at least one first seat swings relative to the main body, the positioning projection is configured to be embedded in one of the two positioning recesses.

4. The tool storage device of claim 3, wherein the at least one positioning structure further includes a perforation and a positioning arm, the perforation is disposed through the bottom portion, the positioning arm is disposed on the bottom portion and extends through the perforation, the positioning projection is formed on the positioning arm, and the two positioning recesses are disposed on the at least one first seat.

5. The tool storage device of claim 4, wherein the at least one positioning structure further includes a reinforcement rib, and the reinforcement rib is connected to and between the bottom portion and the positioning arm.

6. The tool storage device of claim 1, wherein the base further includes at least one through hole, the at least one through hole is formed in at least one of the two flanges, such that a portion of at least one of the two flanges is not connected to the main body to form at least one elastic section, the at least one urging convexity is disposed on the at least one elastic section, and the at least one through hole provides a clearance space for deformation of the at least one elastic section; the main body includes a bottom portion and two side portions, the two side portions protrude from the bottom portion, two sides of the at least one first seat are rotatably connected to the two side portions, the bottom portion is arcuate relative to a side of the at least one first seat, the at least one restriction hole is disposed through the bottom portion, and at least one restricting convexity of the at least one first seat is inserted in the at least one restriction hole; the at least one positioning structure further includes two positioning recesses, a positioning projection, a perforation, a positioning arm, and a reinforcement rib, one of the two positioning recesses and the positioning projection is disposed on the at least one first seat, and an other the two positioning recesses and the positioning projection is disposed on the bottom portion; when the at least one first seat swings relative to the main body, the positioning projection is configured to be embedded in one of the two positioning recesses; the perforation is disposed through the bottom portion, the positioning arm is disposed on the bottom portion and protrudes through the perforation, the positioning projection is formed on the positioning arm, the two positioning recesses are disposed on the at least one first seat, and the reinforcement rib is connected to and between the bottom portion and the positioning arm; the at least one first seat further includes a first bottom wall and at least one first frame, the first frame protrudes laterally from the first bottom wall to define the first chamber, the first frame includes a first fixed wall and a first movable wall, the first fixed wall is fixed to the first bottom wall, and the first movable wall is connected to the first fixed wall and is swingably movable relative to the first bottom wall; the first movable wall and the first fixed wall define a first slot, and the first slot is in communication with the first chamber, the at least one first frame further includes a first urging block, the first urging block is disposed on the first movable wall and protrudes within the first chamber, and the first urging block is configured to be pressed against the tool; the tool storage device further includes at least one second seat, the at least one second seat is fixed to the base, the at least one second seat includes at least one second chamber for receiving the tool, the at least one second seat further includes a second bottom wall and at least one second frame, the second frame protrudes laterally from the second bottom wall to define the second chamber the second frame includes a second fixed wall and a second movable wall, the second fixed wall is fixed to the second bottom wall, and the second movable wall is connected to the second fixed wall and is swingably movable relative to the second bottom wall; the second movable wall and the second fixed wall define a second slot, the second slot is in communication with the second chamber, the at least one second frame further includes a second urging block, the second urging block is disposed on the second movable wall and protrudes within the second chamber, and the second urging block is configured to be pressed against the tool; the at least one first seat is one, the number of the at least one second seat is one, the at least one first frame includes a plurality of first frames, the at least one second frame includes a plurality of second frames, the numbers of plurality of first frames and the plurality of second frames are equal, the plurality of first frames and the plurality of second frames are arranged in a row in the first direction, and each of the plurality of first frames corresponds to one of the plurality of second frames in a direction perpendicular to the first direction, the first slot is disposed on a side of the first frame facing the second frame, and the second slot is disposed on a side of the second frame facing the first frame; the first slot and the second slot are in an offset arrangement in a direction perpendicular to the first direction; the at least one second seat and the base are integrally formed of one piece; each of the plurality of first frames is hexagonal, each of the plurality of second frames is hexagonal, corners of two adjacent ones of the plurality of first frames are connected to each other, and corners of two adjacent ones of the plurality of second frames are connected to each other; the positioning projection gradually tapers in a direction away from the positioning arm; the reinforcement rib has a thickness gradually decreasing in a direction from the bottom portion toward the positioning projection.

7. A tool storage device including:

a base; and at least one first seat swingably disposed on the base, and including at least one first chamber, the first chamber configured to receive a tool;

wherein the base includes a main body and at least one restriction hole, the main body includes a bottom portion and two side portions, the two side portions protrude from the bottom portion, two sides of the at least one first seat are rotatably connected to the two side portions, the at least one restriction hole is disposed through the bottom portion, and at least one restricting convexity of the at least one first seat is inserted in the at least one restriction hole.

8. The tool storage device of claim 7, wherein the bottom portion is arcuate relative to a side of the at least one first seat.

9. A tool storage device including:

a base; and at least one first seat swingably disposed on the base, and including at least one first chamber, the first chamber configured to receive a tool;

wherein the at least one first seat further includes a first bottom wall and at least one first frame, the first frame protrudes laterally from the first bottom wall to form the first chamber, the first frame includes a first fixed wall and a first movable wall, the first fixed wall is non-movably disposed on the first bottom wall, the first movable wall is connected to the first fixed wall and swingable relative to the first bottom wall, the first movable wall and the first fixed wall define a first slot, and the first slot is in communication with the first chamber.

10. The tool storage device of claim 9, wherein the at least one first frame further includes a first urging block, the first urging block is disposed on the first movable wall and protrudes within the first chamber, and the first urging block is configured to press against the tool.

11. The tool storage device of claim 9, further including at least one second seat, wherein the at least one second seat is fixedly disposed on the base, the at least one second seat includes at least one second chamber configured to receive the tool.

12. The tool storage device of claim 11, wherein the at least one second seat further includes a second bottom wall and at least one second frame, the second frame protrudes laterally from the second bottom wall to form the second chamber, the second frame includes a second fixed wall and a second movable wall, the second fixed wall is non-movably disposed on the second bottom wall, the second movable wall is connected to the second fixed wall and swingable relative to the second bottom wall, the second movable wall and the second fixed wall define a second slot, and the second slot is in communication with the second chamber.

13. The tool storage device of claim 12, wherein the at least one second frame further includes a second urging block, the second urging block is disposed on the second movable wall and protrudes within the second chamber, and the second urging block is configured to press against the tool.

14. The tool storage device of claim 12, wherein the at least one first seat is one, the number of the at least one second seat is one, the at least one first frame includes a plurality of first frames, the at least one second frame includes a plurality of second frames, the numbers of plurality of first frames and the plurality of second frames are equal, the plurality of first frames and the plurality of second frames are arranged in a row in the first direction, and each of the plurality of first frames corresponds to one of the plurality of second frames in a direction perpendicular to the first direction, the first slot is disposed on a side of the first frame facing the second frame, and the second slot is disposed on a side of the second frame facing the first frame.

15. The tool storage device of claim 14, wherein the first slot and the second slot are in an offset arrangement in a direction perpendicular to the first direction.

* * * * *